(12) United States Patent
Horesh (10) Patent No.: US 10,191,539 B2
(45) Date of Patent: Jan. 29, 2019

(54) USER AWARE ODOMETRY CORRECTION TECHNOLOGY

(71) Applicant: Intel Corporation, Santa Clara, CA (US)

(72) Inventor: Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/463,799

(22) Filed: Mar. 20, 2017

(65) Prior Publication Data

US 2018/0267602 A1    Sep. 20, 2018

(51) Int. Cl.
   *G06F 3/01* (2006.01)

(52) U.S. Cl.
   CPC .............. *G06F 3/012* (2013.01); *G06F 3/013* (2013.01)

(58) Field of Classification Search
   CPC ................................. G06F 3/012; G06F 3/013
   See application file for complete search history.

(56) References Cited

U.S. PATENT DOCUMENTS

| | | | | |
|---|---|---|---|---|
| 5,583,590 A * | 12/1996 | Clupper | ............... | A61B 3/113 340/575 |
| 2014/0355861 A1 * | 12/2014 | Nirenberg | ............... | H04N 19/85 382/133 |
| 2016/0007849 A1 * | 1/2016 | Krueger | ............... | A61B 3/113 600/301 |
| 2016/0012622 A1 * | 1/2016 | Lee | ............... | G06T 11/60 345/629 |
| 2016/0077785 A1 * | 3/2016 | Sugden | ............... | G02B 27/017 345/8 |
| 2016/0259410 A1 * | 9/2016 | Moore | ............... | G06F 3/016 |
| 2016/0286210 A1 * | 9/2016 | Border | ............... | G02B 27/0176 |
| 2017/0052595 A1 * | 2/2017 | Poulos | ............... | G02B 27/0103 |
| 2017/0123489 A1 * | 5/2017 | Guenter | ............... | G06F 3/013 |
| 2017/0132806 A1 * | 5/2017 | Balachandreswaran | ............... | G06T 7/74 |
| 2017/0285736 A1 * | 10/2017 | Young | ............... | G06F 3/013 |

OTHER PUBLICATIONS

"Oculus Developer Guide—SDK Version 0.4", Oct. 24, 2014, 63 pages, Oculus VR, LLC, Irvine, CA.

* cited by examiner

*Primary Examiner* — Premal R Patel
(74) *Attorney, Agent, or Firm* — Jordan IP Law, LLC (57) ABSTRACT

Systems, apparatuses and methods may provide for technology to detect a pose drift condition with respect to a head mounted display based on one or more first signals, to detect a reduced perception state with respect to the head mounted display based on one or more second signals, and to trigger a correction of the pose drift condition during the reduced perception state. Additionally, the reduced perception state may correspond to, for example, a blinking condition, a saccadic motion condition and/or an increased head rotation rate.

21 Claims, 9 Drawing Sheets

USER AWARE ODOMETRY CORRECTION TECHNOLOGY

TECHNICAL FIELD

Embodiments generally relate to odometry correction technology. More particularly, embodiments relate to the use of odometry drift correction when a user is in a reduced perception state.

BACKGROUND

Augmented reality (AR) and virtual reality (VR) applications may estimate headset motion (e.g., rotation and translation) over time ("odometry"). Some headsets may operate based on inside-out tracking (e.g., MICROSOFT HOLOLENS). Inside-out tracking may lack an absolute reference landmark and thus may introduce an accumulating error ("drift") in the pose of the user. While there may be methods to correct the drift, human perception may be very sensitive to any inconsistencies or discontinuities introduced by such corrections.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
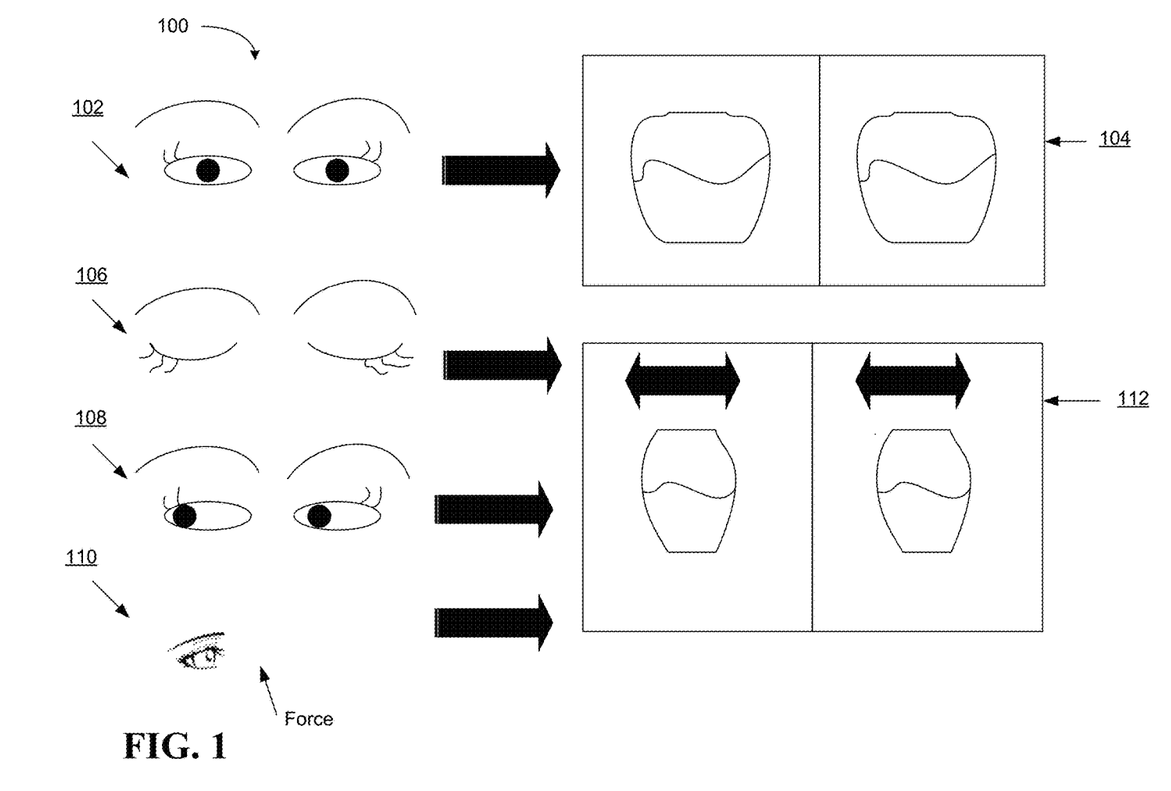
FIG. 1 is an illustration of an example of changes made in a picture displayed based on a user pose condition according to an embodiment.

FIG. 1 illustrates an example of changes made in a picture displayed based on a user pose condition. For example, when the user of a head mounted system (e.g., head mounted display/HMD) is in a "normal" position (i.e., a head and a body are in a still position with eyes being fully opened), as shown in position 102, the user is able to see a non-disturbed picture 104. As soon as the user position changes, for example, the user blinks, as illustrated in position 106, when the user opens his or her eyes again, the picture gets distorted, as displayed in picture 112. For example, during saccadic motion, as illustrated in position 108, or when the user rotates his or her head, as illustrated in position 110, and when the user returns to the normal position, the picture gets distorted, as displayed in picture 112. During blinking, saccadic and head turning motion, the distortion in the picture 112 occurs because the visual system is suppressed and the location perception is more tolerant to inconsistent visual-inertial information. As will be discussed in greater detail, corrections in pose drift may be made during the reduced perception states reflected in positions 106, 108 and/or 110.

Figure 2A:
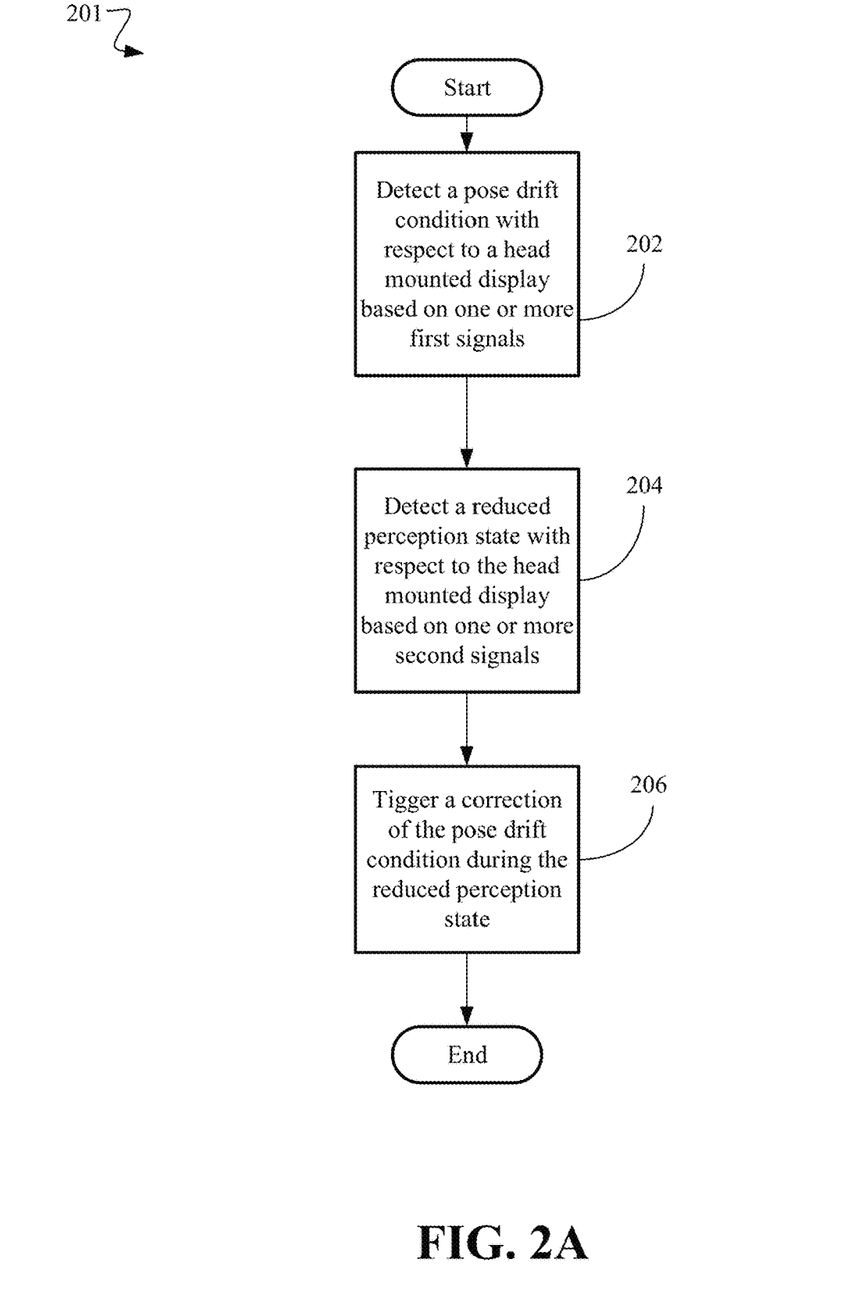
FIG. 2A is a flowchart of an example of a method of operating a semiconductor package apparatus according to an embodiment.

FIG. 2A illustrates a flowchart of an example of a method 201 of operating a semiconductor package apparatus to achieve drift correction according to an embodiment. The method 201 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in method 201 may be written in any combination of one or more programming languages, including an object-oriented programming language such as C#, JAVA or the like. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 202 provides for detecting a pose drift condition with respect to a head mounted display (HMD) based on one or more first signals. The one or more first signals may be generated by, for example, one or more drift detectors. Block 204 may detect a reduced perception state with respect to the HMD based on one or more second signals. The one or more second signals may be generated by, for example, a perception monitor. The reduced perception state may correspond to, for example, a blinking condition and/or saccadic motion condition. The reduced perception state may also correspond to, for example, an increased head rotation rate. In illustrated processing block 206, a correction of the pose drift condition is triggered during the reduced perception state.

Figure 2B:
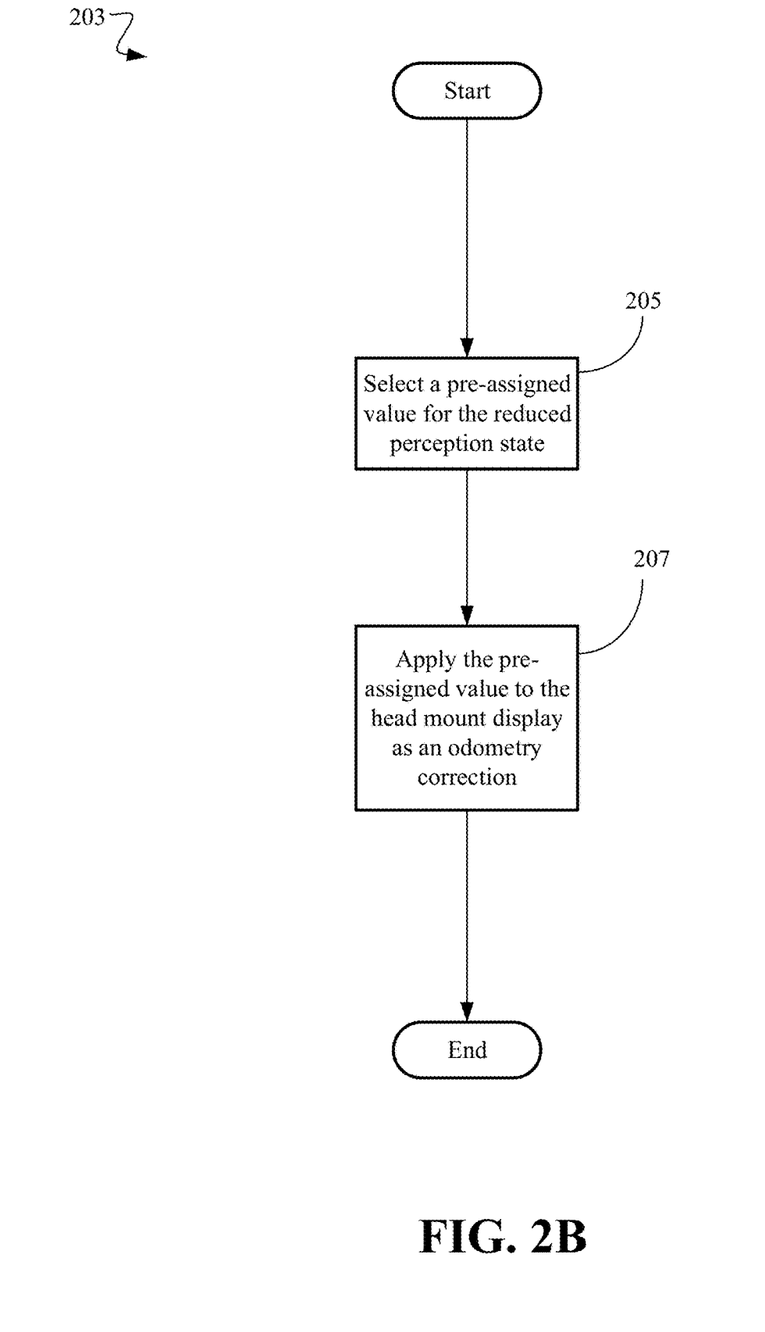
FIG. 2B is a flowchart of an example of a method of triggering a correction of a pose drift condition according to an another embodiment.

FIG. 2B illustrates a flowchart of an example of a method 203 of triggering a correction of a pose drift condition. The method 203 may therefore be incorporated into block 206 (FIG. 2A), already discussed. The method 203 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 205, the drift correction apparatus selects a pre-assigned value for the reduced perception state. The pre-assigned value may represent the human perception tolerance to changing the pose in that state. For example, the system may assign the following values:

1 cm and 0.1° for blinking condition;

0.2 cm and 0.03° for saccadic motion condition; and 0 cm and 0.0° when the reduced perception state is absent.

In illustrated processing block 207, the drift correction apparatus applies the pre-assigned value of the head mounted display as an odometry correction.

Figure 2C:
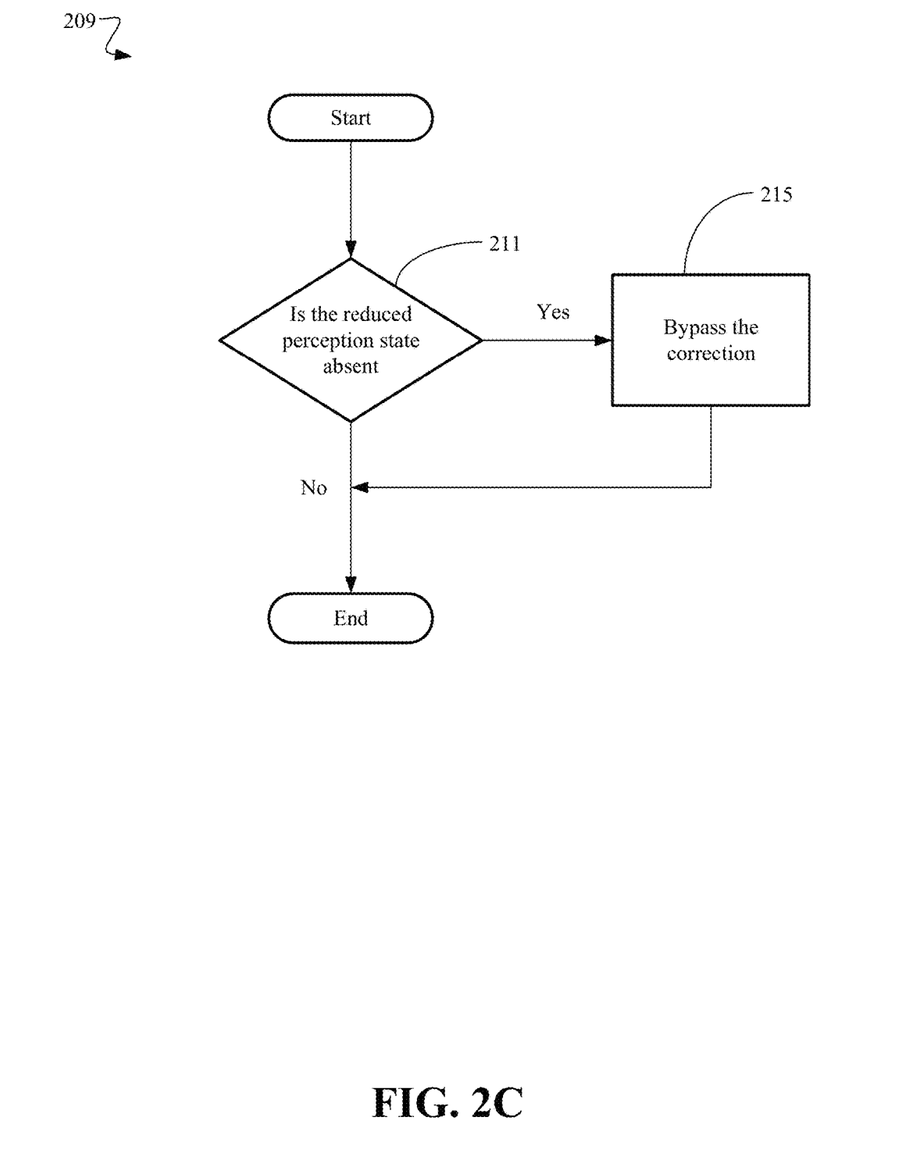
FIG. 2C is a flowchart of an example of a method of operating a semiconductor package apparatus according to an another embodiment.

FIG. 2C illustrates a flowchart of an example of a method 209 of responding to a reduced perception state. The method 209 may therefore be incorporated into block 204 (FIG. 2A), already discussed. The method 209 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 211 determines whether the reduced perception state is absent. As already noted, block 211 may include analyzing one or more signals from an eye tracker (e.g., to detect a blinking and/or saccadic motion condition), an inertia measurement unit (e.g., to detect an increased head rotation rate), etc., or any combination thereof. If the reduced perception state is absent, block 215 may bypass the correction of the pose drift.

Figure 3A:
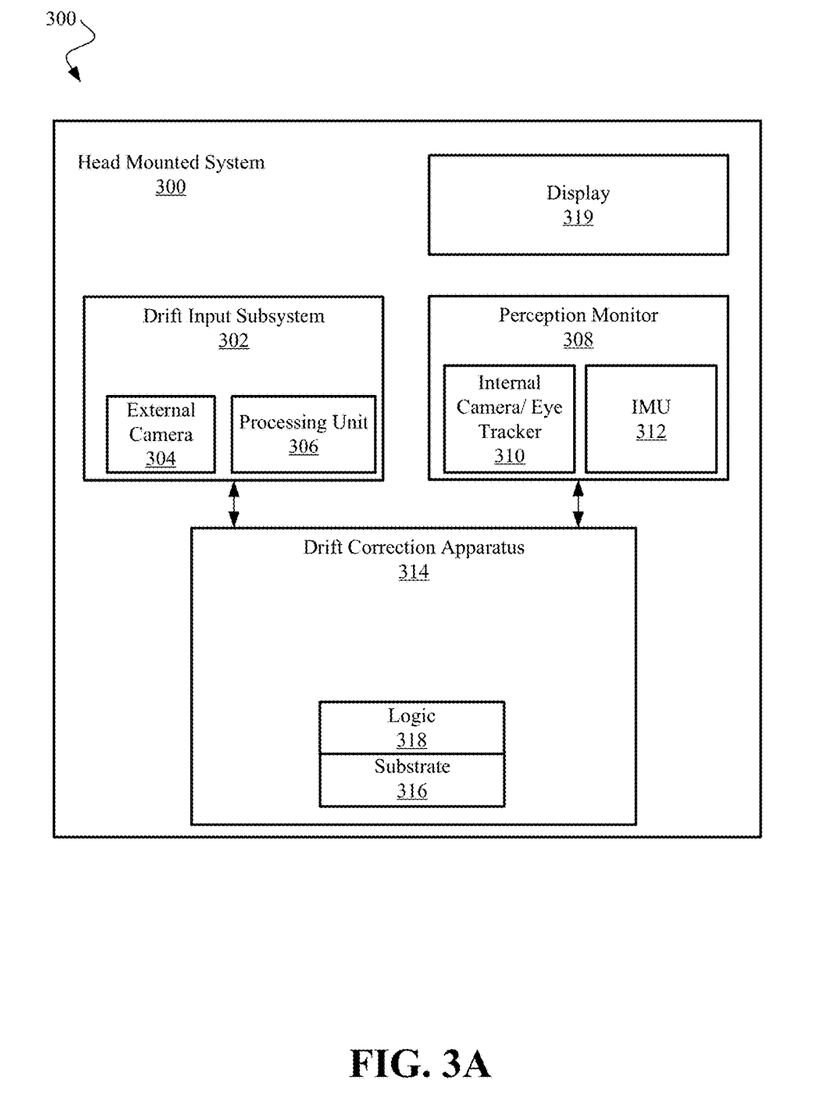
FIG. 3A is a block diagram of an example of a head mounted system according to an embodiment.

FIG. 3A shows is a block diagram of an example of a head mounted system 300 according to an embodiment. The system 300 may generally implement one or more aspects of the methods 201 (FIG. 2A), the method 203 (FIG. 2B) and/or the method 209 (FIG. 2C), already discussed. In the illustrated example, the system 300 may include a drift input subsystem 302 that generates one or more first signals. The input subsystem 302 may include, for example, an external camera 304 and/or a processing unit 306 (e.g., CPU, digital signal processor/DSP), wherein the camera 304 and the processing unit 306 may detect and generate the first signal (s) in response to, for example, a pose drift and/or an HMD motion. Thus, the first signals may include still images and/or video frames generated by the external camera 304, pose data generated by the processing unit 306, and so forth.

The system 300 may also include a perception monitor 308 that generates one or more second signals. The perception monitor 308 may include, for example, an internal camera and/or eye tracker 310 that detects and generates one or more second signals in response to a reduced perception state, such as a blinking condition and/or a saccadic motion condition. The perception monitor 308 may also include, for example, an inertia measurement unit (IMU) 312 that detects and generates the second signal(s) in response to a reduced perception state such as an increased head rotation rate.

The system 300 may also include a drift correction apparatus 314 (e.g., semiconductor package apparatus configured to correct drift) communicatively coupled to the drift input subsystem 302 and the perception monitor 308. The apparatus 314 may include for example, a substrate 316 (e.g., silicon, sapphire, gallium arsenide) and logic 318 (e.g., transistor array and other integrated circuit/IC components), coupled to the substrate 316. The logic 318 may include configurable logic, fixed-functionality logic hardware, etc., or any combination thereof. The logic 318 may also include logic instructions that are retrieved from a non-transitory computer readable storage medium and executed on one or more processor cores.

Figure 3B:
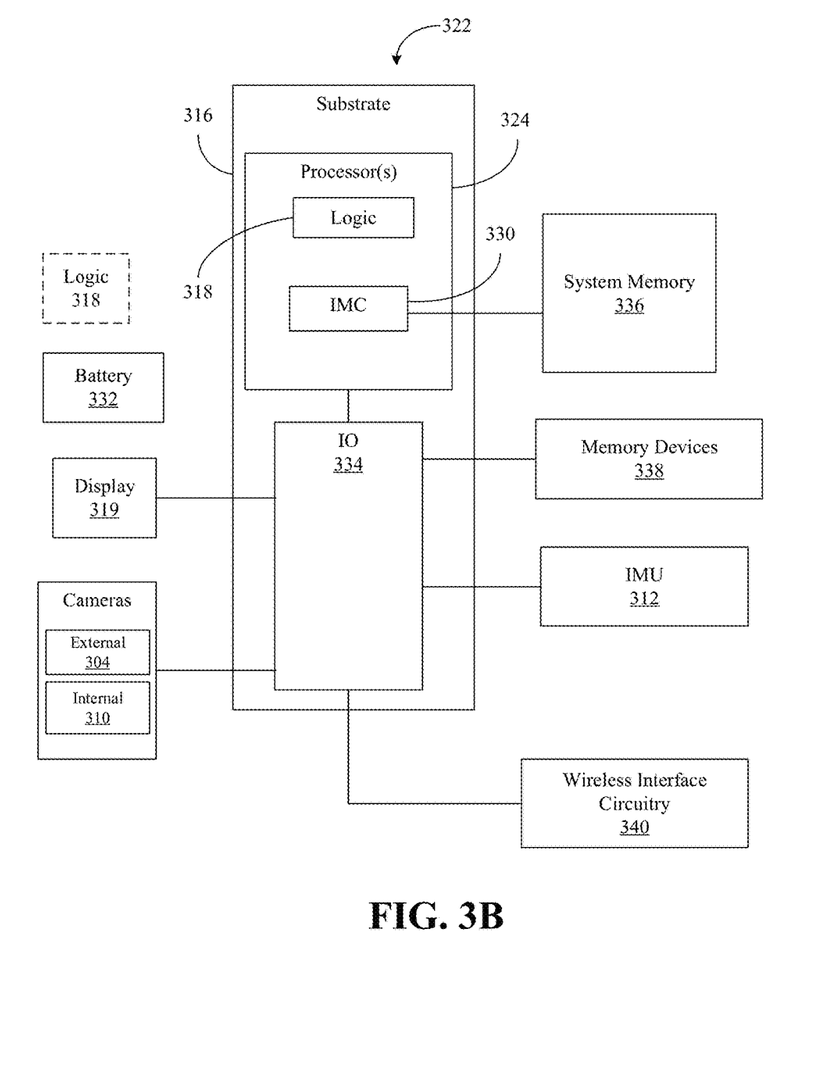
FIG. 3B is a block diagram of an example of a system according to an embodiment.

FIG. 3B shows a block diagram of an example of a system 322 according to another embodiment. The system 322 may generally be part of an electronic device/platform having computing functionality (e.g., personal digital assistant/PDA, notebook computer, tablet computer, server), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 322 includes a power source (e.g., battery) 332 to supply power to the system 322 and a processor 324 (e.g., host processor, central processing unit/CPU) having an integrated memory controller (IMC) 330. The IMC 326 may communicate with system memory 336. The system memory 336 may include, for example, volatile dynamic RAM (DRAM) configured as one or more memory modules such as, for example, dual inline memory modules (DIMMs), small outline DIMMs (SODIMs), etc.

The illustrated system 322 also includes an input output (TO) module 334 implemented together with the processor 324 on a semiconductor substrate 316 as a system on chip (SoC), wherein the IO module 334 functions as a host device and may communicate with, for example, a display 319 (e.g., HMD, touch screen, liquid crystal display/LCD, light emitting diode/LED display), memory devices 338 (e.g., mass storage), an IMU 312, an external camera 304, an internal camera 310, and wireless interface circuitry 340. The IMC 330 may include instructions (not shown) stored in the system memory 336/memory devices 338 and/or logic 318 that enables the processor 324 to function similarly to the semiconductor package apparatus 314 (FIG. 3A) and may implement one or more aspects of the methods 201, 203 and 209 (FIGS. 2A, 2B and 2C, respectively), already discussed. The logic 318, which may be implemented in logic instructions, configurable logic and/or fixed-functionality logic hardware, may optionally be implemented elsewhere in the system 322.

Thus, the logic 318 may detect a pose drift condition with respect to the display 319 based on one or more first signals, detect a reduced perception state with respect to a wearer of the display 319 based on one or more second signals, and trigger a correction of the pose drift condition during the reduced perception state. In this regard, vision (or Inertial plus Vision) based odometry may compute the relative pose (e.g., the "egomotion") of the system 322. Since generally there may be no absolute reference for the position, the odometry estimation errors may accumulate (i.e. drift) along the motion. There may be several ways to detect the odometry drift: one way is re-localization. Re-localization includes identifying distinct features and storing them in the device memory together with the current location. When those features are identified again, the stored location may be compared with the current location (with appropriate geometrical transformation). The second way may be to optimize the odometry calculation over a larger data set (e.g. all the data captured by the sensor) and with a more robust optimization (e.g. "bundle adjustment") than available for the real-time computation. A third way may be to combine re-localization with optimization. In one example, the logic 318 selects a pre-assigned value based on the reduced perception state and applies the pre-assigned value to the display 319 as an odometry correction.

Figure 3C:
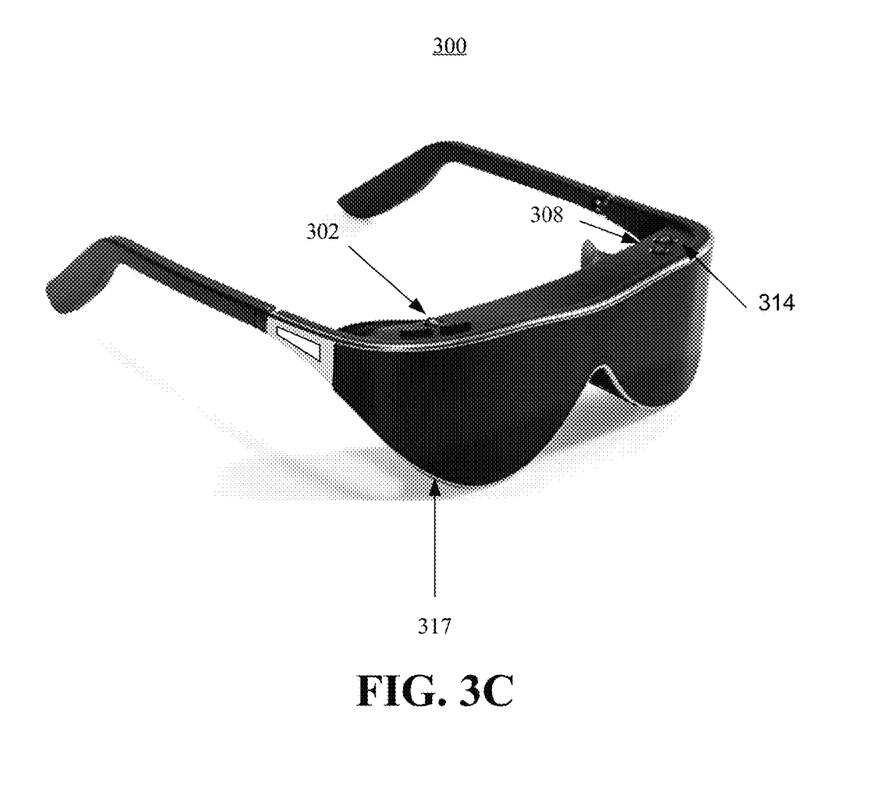
FIG. 3C is an illustration of a system including a housing with a wearable form factor according to an embodiment.

FIG. 3C shows a head mounted system 300 including a housing 317 with a wearable form factor according to an embodiment. The wearable form factor may include, for example, an eyewear, headwear or other wearable form factor, depending on the circumstances. The system 300 may also include the drift input subsystem 302, the perception monitor 308 and the drift correction apparatus 314, already discussed.

Figure 4:
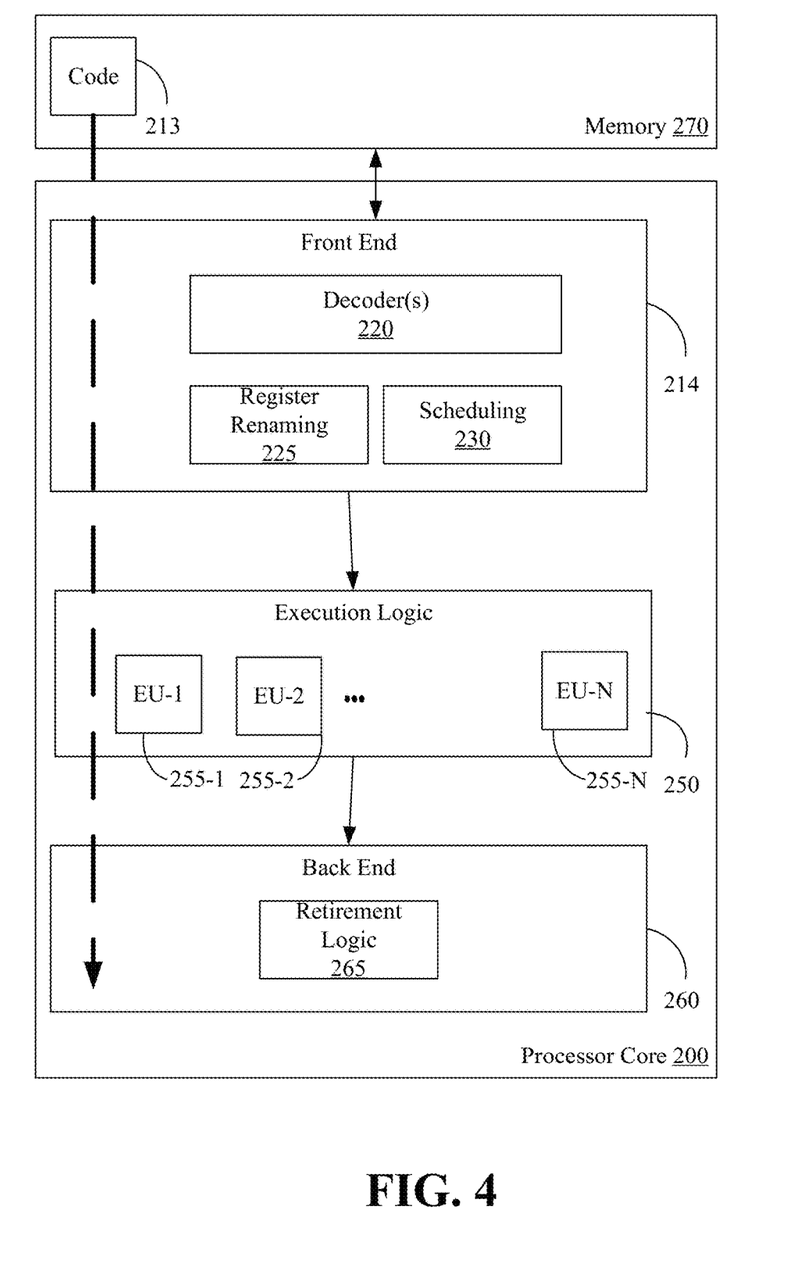
FIG. 4 is a block diagram of an example of a processor according to an embodiment.

FIG. 4 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the methods 201, 203 and 209 (FIGS. 2A, 2B and 2C, respectively), already discussed. The processor core 200 follows a program sequence of instructions indicated by the code 213. Each instruction may enter a front end portion 214 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 214 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
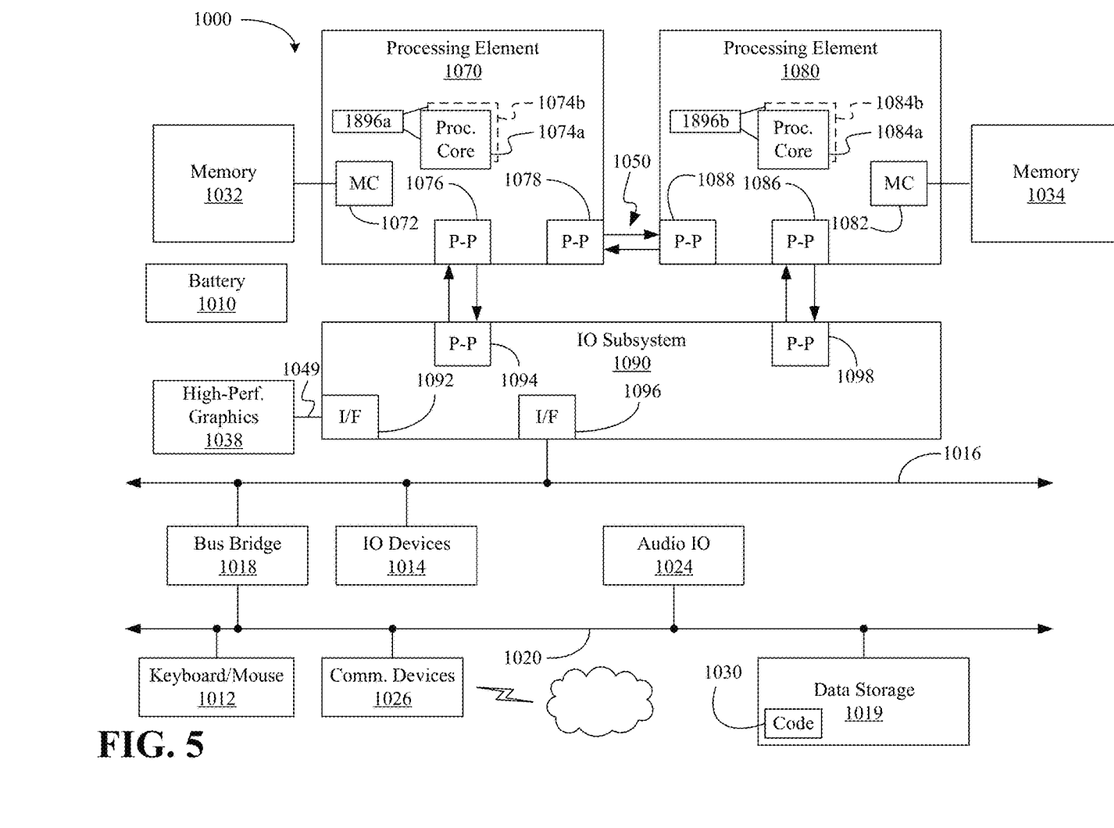
FIG. 5 is a block diagram of an example of a computing system according to an embodiment.

Referring now to FIG. 5, shown is a block diagram of a system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the methods 201, 203 and 209 (FIGS. 2A, 2B and 2C), already discussed, and may be similar to the code 213 (FIG. 4), already discussed. The system 1000 may also include an emotional workout apparatus such as, for example, the apparatus 314 (FIG. 3A). Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5. Moreover, the network controllers/communication device(s) 1026 may be implemented as a HFI (host fabric interface), also known as NIC (network interface card), that is integrated with one or more of the processing elements 1070, 1080 either on the same die, or in the same package.

Additional Notes and Examples

Example 1 may include a head mounted system, comprising a display, a camera, wireless interface circuitry, a battery, a housing including a wearable form factor, one or more drift detectors to generate one or more first signals, a perception monitor to generate one or more second signals, one or more processors, memory, and one or more storage devices to store instructions, which when executed by at least one of the one or more processors, cause the system to detect a pose drift condition with respect to the display based on at least one of the one or more first signals, detect a reduced perception state with respect to a wearer of the display based on at least one of the one or more second signals, and trigger a correction of the pose drift condition during the reduced perception state.

Example 2 may include the system of Example 1, wherein the perception monitor includes an eye tracker and the reduced perception state is to correspond to a blinking condition.

Example 3 may include the system of Example 1, wherein the perception monitor includes an eye tracker and the reduced perception state is to correspond to a saccadic motion condition.

Example 4 may include the system of Example 1, wherein the perception monitor includes an inertia measurement unit and the reduced perception state is to correspond to an increased head rotation rate Example 5 may include the system of Example 1, wherein the instructions, when executed, cause the system to select a pre-assigned value based on the reduced perception state, apply the pre-assigned value to the display as an odometry correction, and bypass the correction when the reduced perception state is absent.

Example 6 may include any one of Examples 1 to 5, wherein the wearable form factor is an eyewear form factor.

Example 7 may include a semiconductor package apparatus, comprising a substrate and logic coupled to the substrate, wherein the logic is implemented in one or more of configurable logic or fixed functionality hardware logic, the logic to detect a pose drift condition with respect to a head mounted display based on one or more first signals, detect a reduced perception state with respect to the head mounted display based on one or more second signals, and trigger a correction of the pose drift condition during the reduced perception state.

Example 8 may include the apparatus of Example 7, wherein the reduced perception state is to correspond to a blinking condition.

Example 9 may include the apparatus of Example 7, wherein the reduced perception state is to correspond to a saccadic motion condition.

Example 10 may include the apparatus of Example 7, wherein the reduced perception state is to correspond to an increased head rotation rate.

Example 11 may include the apparatus of any one of Examples 7 to 10, wherein the logic is to further select a pre-assigned value for the reduced perception state, and apply the pre-assigned value to the head mount display as an odometry correction.

Example 12 may include the apparatus of any one of Examples 7 to 11, wherein the logic is to further bypass the odometry correction when the reduced perception state is absent.

Example 13 may include a method of operating a semiconductor package apparatus, comprising detecting a pose drift condition with respect to a head mounted display based on one or more first signals, detecting a reduced perception state with respect to the head mounted display based on one or more second signals, and triggering a correction of the pose drift condition during the reduced perception state.

Example 14 may include the method of Example 13, wherein the reduced perception state corresponds to a blinking condition.

Example 15 may include the method of Example 13, wherein the reduced perception state corresponds to a saccadic motion condition.

Example 16 may include the method of Example 13, wherein the reduced perception state corresponds to an increased head rotation rate.

Example 17 may include the method of any one of Examples 13 to 16, wherein triggering the correction of the pose draft condition includes selecting a pre-assigned value for the reduced perception state, and applying the pre-assigned value to the head mount display as an odometry correction.

Example 18 may include the method of any one of Examples 13 to 17, wherein triggering the correction of the pose draft condition further including bypassing the odometry correction when the reduced perception state is absent.

Example 19 may include at least one non-transitory computer readable storage medium comprising a set of instructions which, if executed by a computing device, cause the computing device to detect a pose drift condition with respect to a head mounted display based on one or more first signals, detect a reduced perception state with respect to the head mounted display based on one or more second signals, and trigger a correction of the pose drift condition during the reduced perception state.

Example 20 may include at least one non-transitory computer readable storage medium of Example 19, wherein the reduced perception state is to correspond to a blinking condition.

Example 21 may include at least one non-transitory computer readable storage medium of Example 19, wherein the reduced perception state is to correspond to a saccadic motion condition.

Example 22 may include at least one non-transitory computer readable storage medium of Example 19, wherein the reduced perception state is to correspond to an increased head rotation rate.

Example 23 may include at least one non-transitory computer readable storage medium of any one of Examples 19 to 22, wherein the instructions, if executed, cause the computing device to select a pre-assigned value for the reduced perception state, and apply the pre-assigned value to the head mount display as an odometry correction.

Example 24 may include at least one non-transitory computer readable storage medium of any one of Examples 19 to 23, wherein the instructions, if executed, cause the computing device to bypass the odometry correction when the reduced perception state is absent.

Example 25 may include a semiconductor package apparatus, comprising means for detecting a pose drift condition with respect to a head mounted display based on one or more first signals, means for detecting a reduced perception state with respect to the head mounted display based on one or more second signals, and means for triggering a correction of the pose drift condition during the reduced perception state.

Example 26 may include the apparatus of Example 25, wherein the reduced perception state is to correspond to a blinking condition.

Example 27 may include the apparatus of Example 25, wherein the reduced perception state is to correspond to a saccadic motion condition.

Example 28 may include the apparatus of Example 25, wherein the reduced perception state is to correspond to an increased head rotation rate.

Example 29 may include the apparatus of any one of Examples 25 to 28, wherein means for triggering the correction of the pose draft condition further including means for selecting a pre-assigned value for the reduced perception state, and means for applying the pre-assigned value to the head mount display as an odometry correction.

Example 30 may include the apparatus of any one of Examples 25 to 29, wherein means for triggering the correction of the pose draft condition further including means for bypassing the odometry correction when the reduced perception state is absent.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

I claim:
1. A system comprising:
a display;
a camera;
wireless interface circuitry;

a battery;

a housing including a wearable form factor;

one or more drift detectors to generate one or more first signals;

a perception monitor to generate one or more second signals;

one or more processors;

memory; and one or more storage devices to store instructions, which when executed by at least one of the one or more processors, cause the system to:

detect a pose drift condition with respect to the display based on at least one of the one or more first signals;

detect a reduced perception state with respect to a wearer of the display based on at least one of the one or more second signals; and     trigger a correction of the pose drift condition during the reduced perception state that is to include a selection of a pre-assigned value based on a perception tolerance in the reduced perception state and an application of the pre-assigned value to the display.

2. The system of claim 1, wherein the perception monitor includes an eye tracker and the reduced perception state is to correspond to a blinking condition.

3. The system of claim 1, wherein the perception monitor includes an eye tracker and the reduced perception state is to correspond to a saccadic motion condition.

4. The system of claim 1, wherein the perception monitor includes an inertia measurement unit and the reduced perception state is to correspond to an increased head rotation rate.

5. The system of claim 1, wherein the instructions, when executed, cause the system to bypass the correction when the reduced perception state is absent.

6. The system of claim 1, wherein the wearable form factor is an eyewear for factor.

7. An apparatus comprising:

a substrate; and logic coupled to the substrate, wherein the logic is implemented in one or more of configurable logic or fixed functionality hardware logic, the logic to:

detect a pose drift condition with respect to a head mounted display based on one or more first signals;

detect a reduced perception state with respect to the head mounted display based on one or more second signals; and     trigger a correction of the pose drift condition during the reduced perception state that is to include a selection of a pre-assigned value based on a perception tolerance in the reduced perception state and an application of the pre-assigned value to the head mounted display.

8. The apparatus of claim 7, wherein the reduced perception state is to correspond to a blinking condition.

9. The apparatus of claim 7, wherein the reduced perception state is to correspond to a saccadic motion condition.

10. The apparatus of claim 7, wherein the reduced perception state is to correspond to an increased head rotation rate.

11. The apparatus of claim 7, wherein the logic is to further bypass the correction when the reduced perception state is absent.

12. A method comprising:

detecting a pose drift condition with respect to a head mounted display based on one or more first signals;

detecting a reduced perception state with respect to the head mounted display based on one or more second signals; and triggering a correction of the pose drift condition during the reduced perception state that includes a selection of a pre-assigned value based on a perception tolerance in the reduced perception state and an application of the pre-assigned value to the head mounted display.

13. The method of claim 12, wherein the reduced perception state corresponds to a blinking condition.

14. The method of claim 12, wherein the reduced perception state corresponds to a saccadic motion condition.

15. The method of claim 12, wherein the reduced perception state corresponds to an increased head rotation rate.

16. The method of claim 12, wherein triggering the correction of the pose draft condition further including bypassing the correction when the reduced perception state is absent.

17. At least one non-transitory computer readable storage medium comprising a set of instructions which, if executed by a computing device, cause the computing device to:

detect a pose drift condition with respect to a head mounted display based on one or more first signals;

detect a reduced perception state with respect to the head mounted display based on one or more second signals; and trigger a correction of the pose drift condition during the reduced perception state that is to include a selection of a pre-assigned value based on a perception tolerance in the reduced perception state and an application of the pre-assigned value to the head mounted display.

18. The at least one non-transitory computer readable storage medium of claim 17, wherein the reduced perception state is to correspond to a blinking condition.

19. The at least one non-transitory computer readable storage medium of claim 17, wherein the reduced perception state is to correspond to a saccadic motion condition.

20. The at least one non-transitory computer readable storage medium of claim 17, wherein the reduced perception state is to correspond to an increased head rotation rate.

21. The at least one non-transitory computer readable storage medium of claim 17, wherein the instructions, if executed, cause the computing device to bypass the correction when the reduced perception state is absent.

* * * * *